June 10, 1969  F. PLASSER ET AL  3,448,522
APPARATUS FOR INDICATING A SUPERELEVATION OF A TRACK
Filed March 21, 1967
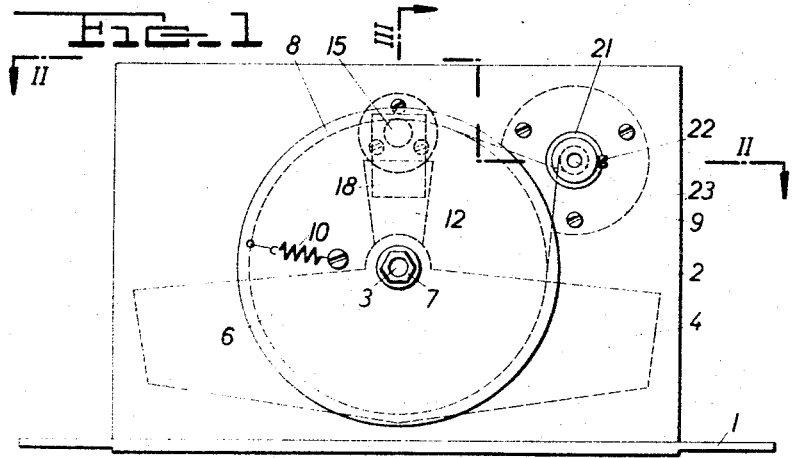
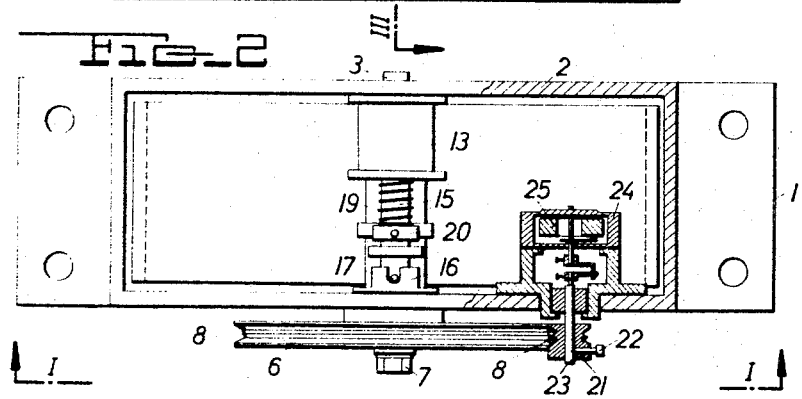
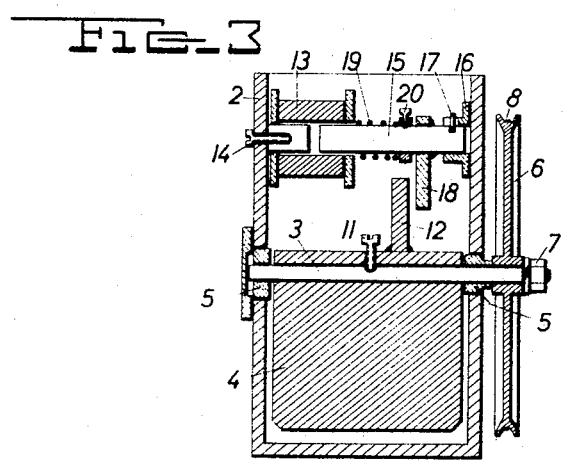
INVENTORS.
FRANZ PLASSER
JOSEF THEURER
BY
Kurt Kelman
AGENT

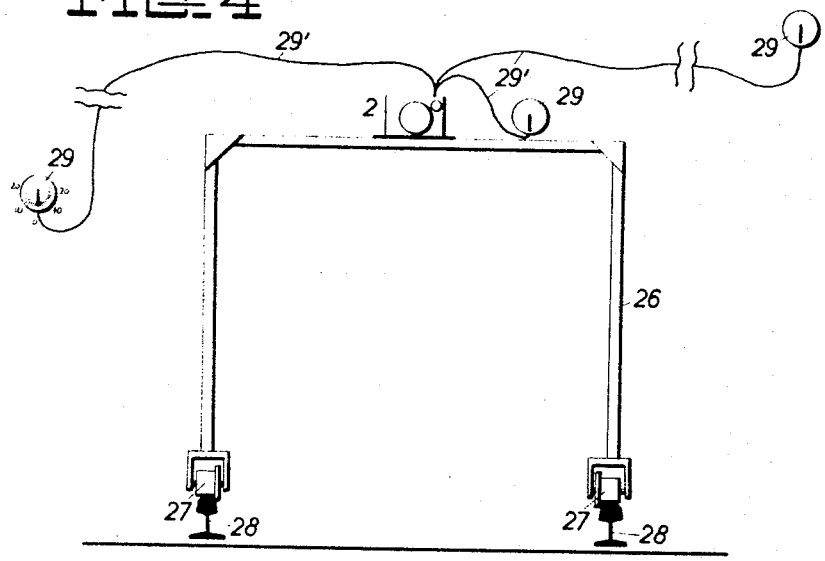
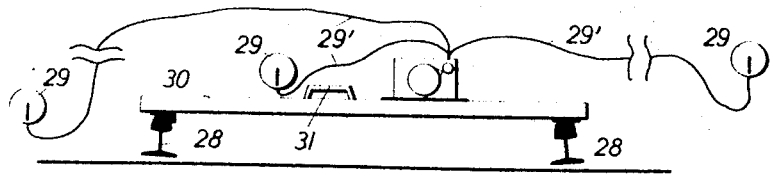
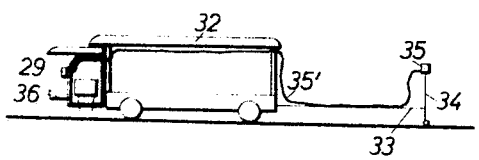
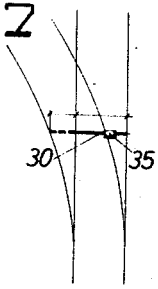

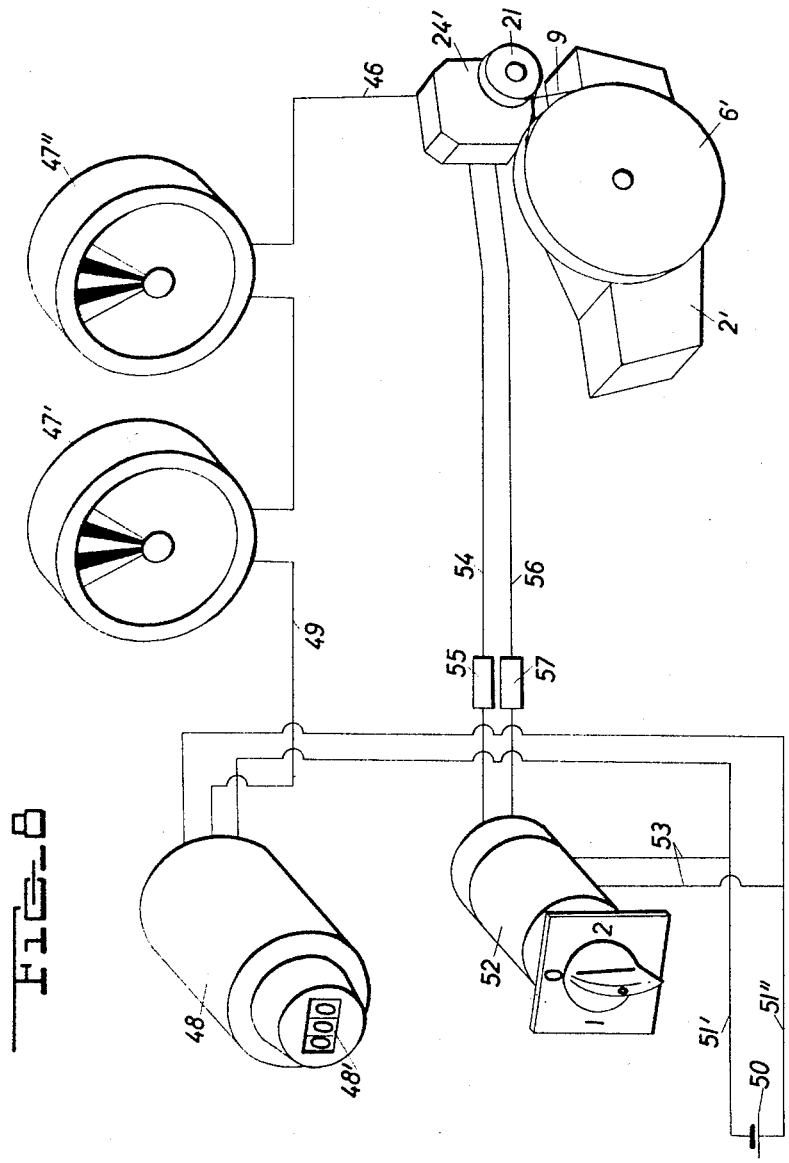

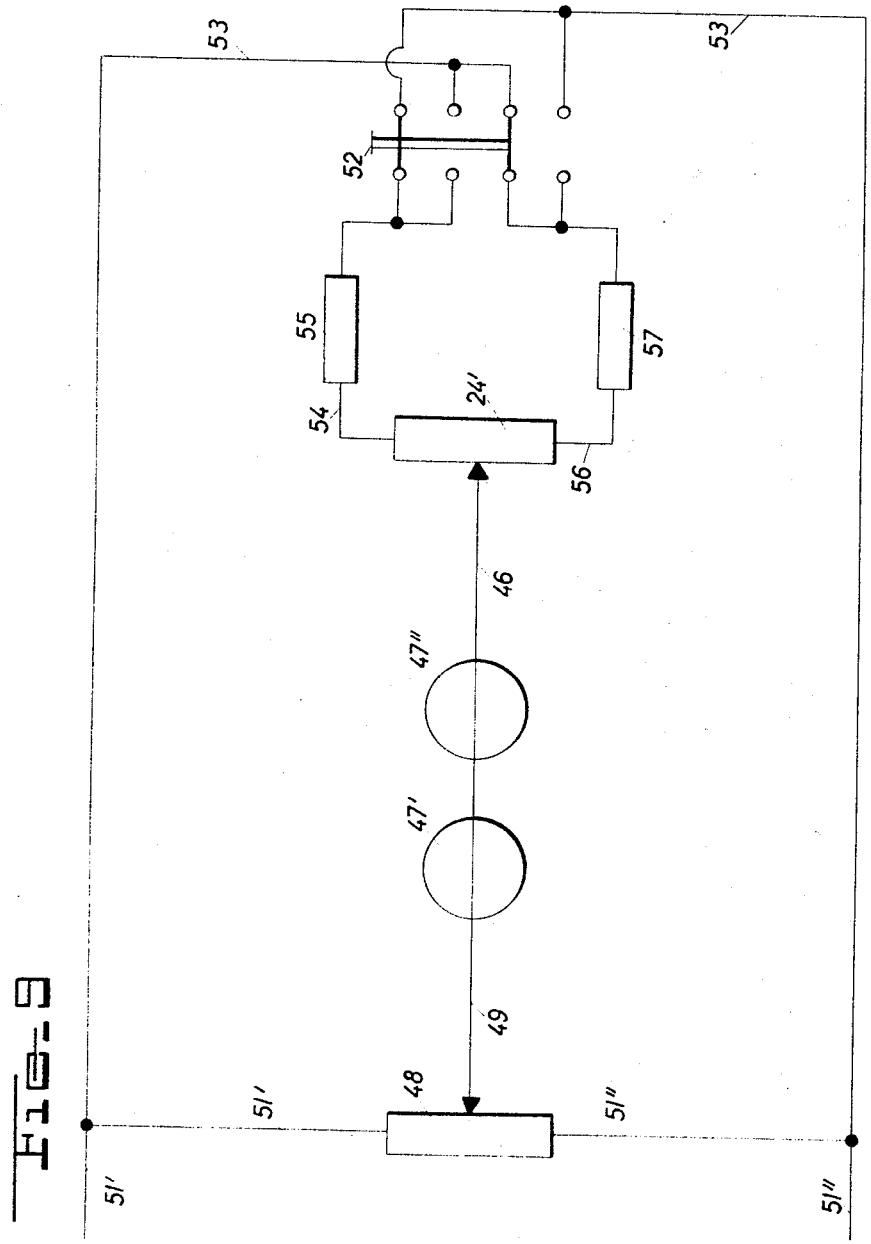

United States Patent Office 3,448,522
Patented June 10, 1969

3,448,522
APPARATUS FOR INDICATING A SUPERELEVATION OF A TRACK
Franz Plasser and Josef Theurer, both of
Johannesgasse 3, Vienna I, Austria
Filed Mar. 21, 1967, Ser. No. 624,927
Claims priority, application Austria, Mar. 24, 1966,
A 2,829/66
Int. Cl. B61k 9/08; E01b 29/04
U.S. Cl. 33—145                                      7 Claims

ABSTRACT OF THE DISCLOSURE

Associated with a track grading machine, an apparatus for indicating the superelevation of a track has a pendulum mounted for pivotal movement in a plane perpendicular to the superelevation. This pivotal movement of the pendulum is mechanically transmitted at an increased ratio to the movable part of a potentiometer which thus produces a varying electrical signal in direct response to the pendulum movement, and this electrical signal may be used to indicate the superelevation and to control its adjustment.

BACKGROUND AND SUMMARY OF THE INVENTION

The present invention relates to an apparatus for indicating and/or correcting a superelevation in track grading operations.

Conventional apparatus of this type has been rather cumbersome and poorly adapted for automatically controlling grading operations or for transmission of the indicated superelevation parameter to remote stations. Also, such known apparatus took up considerable space, which made it difficult to mount it in such locations on track liners or tampers, where it was needed. On the other hand, miniaturization of such apparatus has not been possible without seriously impairing the accuracy thereof.

It is the primary object of this invention to provide an apparatus for indicating the superelevation of a track, which operates most accurately while requiring a minimum of space, while at the same time making it possible not only to amplify the indicated parameter of the superelevation but also to transmit a corresponding signal to remote stations. Such an apparatus is particularly useful for track tamping, lining and grading machines, particularly machines for tamping track switches.

This and other objects are accomplished in accordance with the invention with an apparatus which comprises a pendulum mounted on an axle for pivotal movement in a plane perpendicular to the superelevation, a device, preferably a potentiometer, including a movable part for producing variable electrical signals in response to the movement of this part, and a mechanical transmission transmitting any pivotal movement of the pendulum to the movable part. In this manner, the electrical signals vary in direct response to the pendulum movement, and the pendulum may be very small since even very small pendulum movements in response to a change in the superelevation may be made to produce distinct variations in the electrical signals produced by the device, with a high degree of accuracy, which signals may be read and/or used to control grading operations at any desired remote station whereto the signals are transmitted.

The variation in the electrical signals may be of any desired type and the changing superelevation parameters may be expressed in different values of voltage, amperage or ohms. In the preferred embodiment illustrated and described herein, a potentiometer is used to produce electrical signals of different resistance in response to the pendulum movement. The mechanical transmission in the illustrated embodiment includes a driving pulley driven in synchronism with the pivotal movement of the pendulum, a driven pulley connected to the movable part of the potentiometer, and one or more driving cords having respective ends fixedly attached to a respective one of the pulleys so that the driven pulley is in synchronisms with the driving pulley.

To avoid time lags in such an apparatus in track curves where the superelevation changes, it is particularly useful and preferred to provide a second device, which may also be a potentiometer, for producing electrical signals respectively representative of desired superelevations, which signals may be controlled and changed by manual setting of the latter potentiometer. An electrical circuit including one or more indicating devices connects the potentiometers with the indicating device or devices which receive their respective electrical signals so that the signals representative of the desired superelevation may be readily compared with the signals varying with the pendulum movement.

According to a preferred feature, such an apparatus includes means for changing the electrical signals varying with the pivotal pendulum movement in dependence on the direction of the superelevation. Such means may include a switch in the electrical circuit, and a voltage source delivering a constant voltage to the potentiometer producing the electrical signals representative of desired superelevations and to the switch. Two branch lines connect respective poles of the switch to the potentiometer producing electrical signals in response to the pendulum movement, and different electrical resistors in the branch lines control the direction of voltage drop in the latter potentiometer when the switch is operated.

BRIEF DESCRIPTION OF DRAWING

The above and other objects, advantages and features of the present invention will be more fully understood by reference to the following detailed description of certain preferred embodiments, taken in conjunction with the accompanying drawing wherein FIG. 1 is a side view of an embodiment of the present invention;

FIG. 2 is a top view of this embodiment, partly in section along line II—II of FIG. 1;

FIG. 3 is a section along line III—III of FIG. 1;

FIGS. 4 and 5 schematically illustrate the mounting of such apparatus on carriers placed on a track;

FIG. 6 is a schematic side view of a track grading machine provided with an apparatus according to the invention;

FIG. 7 illustrates the placing of the apparatus of FIG. 5 on a track switch;

FIG. 8 schematically shows a perspective of a preferred embodiment of this invention; and FIG. 9 is a circuit diagram showing the operation of the apparatus of FIG. 8.

DETAILED DESCRIPTION

Referring now to the drawing and first to FIGS. 1 to 3, the arrangement according to the present invention is shown mounted on a base plate 1 in a housing 2. The pendulum 4, which has a mass of considerable inertia, is keyed to axle 3 which is pivotally journaled in bearings 5, 5 in the side walls of the housing. A set screw 11 enables the pendulum to be fixed on the axle 3 at any desired angle in relation thereto.

An extension of the axle 3 projecting beyond a bearing 5 in one of the housing side walls carries a driving wheel or pulley 6 which is held on the axle for rotation therewith by nut 7. The pulley 6 has two circumferential grooves 8 receiving at least one driving cord 9. The driving cords are held under tension by means of spring 10.

The pendulum has an upwardly extending projection 12 of permanently magnetic material adjacent, and cooperating with, a downwardly extending projection 18 of solenoid core 15 of magnetizable material. The coil 13 of a solenoid is mounted on one side wall of housing 2 by means of bolt 14, and the solenoid core is journaled in the coil and a bearing 16 on the opposite side wall of the housing. The core is held against rotation by means of a pin 17 in a slot of bearing 16, a return spring 19 normally biasing the core 15 outwardly of the coil 13 so that projection 18 is removed from projection 12. However, when the solenoid is activated so as to attract the core 15 and move it inwardly into engagement of projections 12 and 18, the pivotal movement of pendulum 4 will be damped so that undesired oscillations of the pendulum are avoided. This damping means may also serve to fix the pendulum in any desired angular position other than perpendicular, as it would normally be if it were not held in position by cooperating projections 12 and 18.

The bias of return spring 19 may be adjusted by means of a spring anchor 20 which is mounted on core 15 and may be axially moved thereon to tension or relax the spring.

A driven pulley 21 of a diameter considerably smaller than the diameter of driving pulley 6 is associated with the driving pulley, the driving cord or cords 9 interconnecting the pulleys so that pulley 6 drives pulley 21. The pulley 21 is keyed to axle 23 and its position thereon may be adjusted by set screw 22. The axle 23 is journaled in housing 24 which holds a potentiometer, axle 23 carrying the rotatable part 25 of the potentiometer.

In this manner, the pivotal movement of pendulum 4 is transmitted mechanically to the potentiometer, and since the diameter of driving pulley 6 may be about four or five times the diameter of driven pulley 21, even relatively small pivotal movements of the pendulum will cause relatively large rotational movements of the movable potentiometer part, thus producing an electrical signal which may be used to indicate, record and/or control the lateral inclination which caused the pivotal movement of the pendulum.

In the illustrated embodiment, the driving pulley 6 has two circumferential grooves 8 carrying two driving cords 9 which extend about at least a portion of the circumference of the pulleys. The two ends of the driving cords are fixedly anchored to respective ones of the pulleys so that the two pulleys will move in synchronism without slippage.

FIG. 4 schematically illustrates how such an arrangement may be mounted on a mobile carriage frame 26 forming part of any suitable right-of-way maintenance machine, such as conventional track liners or track grading apparatus. As shown, the carriage frame is supported on wheels or rollers 27 running on rails 28 of the track whose lateral inclination or superelevation is to be controlled. FIG. 4 shows a plurality of indicating, recording and/or control devices 29, 29 which are remote-controlled by the signal delivered by potentiometer 23, 25 and transmitted to these devices by electrical conductors 29' forming part of a control circuit. Such devices may be within view of the operator for his guidance, or they may directly control suitable track grading mechanisms which are thus directly responsive to the pivoting angle of pendulum 4.

In FIG. 5, the arrangement 35 of this invention is used in connection with apparatus for ascertaining the superelevation of a given track point. A transversely extending carrier bar 30 is shown to be provided with handle 31, enabling the carrier bar to be placed on the rails 28 of the track perpendicularly to the axis of elongation of the track. Again, the potentiometer is shown connected to a plurality of devices 29, 29 receiving the signal from the potentiometer through lines 29', 29'.

FIG. 6 schematically shows a conventional mobile track grading machine 32 which pushes a bogie 34 coupled to the machine by rigid rods 33. The bogie carries the arrangement 35 of the present invention to indicate the superelevation of the track at the point of the bogie. As explained hereinabove, the degree of superelevation is translated into an electrical signal and this is transmitted by electrical circuit 35' to indicating device 29 near the seat 36 of the operator where the operator of the machine reads the superelevation and uses this intelligence in the grading operation.

In the embodiment of FIG. 7, the apparatus shown in FIG. 5 is mounted on a track in the region of a switch. In such an arrangement, it is possible to obtain the superelevation of the portion of the branch line extending within the track while the crossbar rests on two rails and there is no uneven support on more than two points.

FIGS. 8 and 9 illustrate a preferred embodiment of the invention. The housing 2' carries the pendulum (not shown) which pivots and thus rotates driving pulley 6' driving pulley 21 by means of driving cord 9, pulley 21 rotating the rotatable part of a potentiometer carried in housing 24' to produce an electrical signal responsive to the pivotal movement of the pendulum, in the manner described hereinabove in connection with FIGS. 1–3.

Electrical conductor 46 transmits the electrical signal from the potentiometer to two indicating devices 47', 47" which are arranged in parallel in the circuit, where the electrical signal emanating from the potentiometer may be read and compared with a control signal. This control signal is received from a manually adjustable control potentiometer 48 which is connected to the indicating device 47' by electrical conductor 49. The adjustment of potentiometer 48 may be read on visible meter 48' and effected by hand to produce any desired electrical signal.

The above-described electrical circuit is fed from an electrical power source 50, which may feed a current of about 70 volts through electrical conductors 51', 51" to potentiometer 48. Branch lines 53, 53 feed the electrical power to a switch 52 whence respective conductors 54, 56 carry the current to the potentiometer in housing 24'. Different electrical resistors 55, 57 are inserted in conductors 54, 56 so that the voltage delivered by these conductors to the potentiometer in housing 24' differs. The position of switch 52 determines the direction of the voltage drop in the potentiometer, and this position is selected in accordance with the desired superelevation of the track and the corresponding pivotal movement of the pendulum in housing 2' to one or the other side.

In this manner, it is possible to transmit to the indicating device always a predetermined electrical signal which is independent of the direction of the superelevation, and this absolute value may readily be compared with the value of the electrical signal emanating from the manually adjustable potentiometer 48, without regard to the direction of the superelevation and the corresponding direction of the pivotal movement of the pendulum.

While the invention has been specifically described hereinabove in connection with certain now preferred embodiments, it will be clearly understood that many variations and modifications may occur to those skilled in the art without departing from the spirit and scope of this invention as defined in the appended claims.

What we claim is:

1. In a tracking grading machine comprising an apparatus for indicating the superelevation of a track, which apparatus comprises a pendulum mounted on an axle extending in the direction of the track for pivotal movement of the pendulum in a plane perpendicular to the track, the improvement of (a) a potentiometer including a movable part mounted on a shaft for producing variable electrical signals in response to the movement of said part;

(b) a mechanical transmission between the pendulum axle and the potentiometer shaft, the mechanical transmission transmitting a pivotal movement of the pendulum to the potentiometer shaft and being arranged to produce an angle of rotation of the potentiometer shaft which is greater than, but proportional to, the angle of rotation of the pendulum axle during the pivotal movement of the pendulum whereby the electrical signals vary in direct response to the pivotal movement of the pendulum and accurately reflect even very small pivotal movements thereof;

(c) another potentiometer for producing electrical signals respectively representative of desired superelevations; and (d) an electrical circuit including at least one indicating device, the electrical circuit being connected to said other potentiometer and receiving the respective electrical signals therefrom, whereby the signals representative of a desired superelevation and the signals varying with the pivotal movement of the pendulum may be compared.

2. The apparatus of claim 1, further comprising at least one remote indicating device, and an electrical circuit connecting said potentiometer to the indicating device and delivering the electrical signals from the potentiometer to the indicating device.

3. The apparatus of claim 1, further comprising a carriage frame mounted for mobility on a track whose superelevation is to be indicated, and said pendulum, potentiometer and mechanical transmission being mounted on said carriage frame.

4. The apparatus of claim 1, further comprising means for changing the electrical signals varying with the pivotal movement of the pendulum in dependence on the direction of superelevation.

5. In the track grading machine of claim 1, the mechanical transmission comprising a driving pulley keyed to the pendulum axle, a driven pulley keyed to the potentiometer shaft, the diameter of the driving pulley being several times that of the driven pulley, and a driving chord having respective ends fixedly attached to respective ones of said pulleys.

6. Apparatus for indicating the superelevation of a track and associated with a track grading machine, comprising (a) a pendulum mounted on an axle extending in the direction of the track for pivotal movement of the pendulum in a plane perpendicular to the track;

(b) a potentiometer including a movable part mounted on a shaft for producing variable electrical signals in response to the movement of said part;

(c) a mechanical transmission between the pendulum axle and the potentiometer shaft, the mechanical transmission transmitting a pivotal movement of the pendulum to the potentiometer shaft and being arranged to produce an angle of rotation of the potentiometer shaft which is greater than, but proportional to, the angle of rotation of the pendulum axle during the pivotal movement of the pendulum whereby the electrical signals vary in direct response to the pivotal movement of the pendulum and accurately reflect even very small pivotal movements thereof; and (d) a mechanism for damping and keeping at rest the pivotal movement of the pendulum, said mechanism including a solenoid means having a movable core, a projection extending from said core, a projection extending from said pendulum adjacent said core projection, and said projections being in engagement for preventing pivotal movement of the pendulum when the solenoid means core is actuated to move the core.

7. Apparatus for indicating the superelevation of a track and associated with a track grading machine, comprising (a) a pendulum mounted on an axle extending in the direction of the track for pivotal movement of the pendulum in a plane perpendicular to the track;

(b) a potentiometer including a movable part mounted on a shaft for producing variable electrical signals in response to the movement of said part;

(c) a mechanical transmission between the pendulum axle and the potentiometer shaft, the mechanical transmission transmitting a pivotal movement of the pendulum to the potentiometer shaft and being arranged to produce an angle of rotation of the potentiometer shaft which is greater than, but proportional to, the angle of rotation of the pendulum axle during the pivotal movement of the pendulum whereby the electrical signals vary in direct response to the pivotal movement of the pendulum and accurately reflect even very small pivotal movements thereof;

(d) a potentiometer for producing electrical signals respectively representative of desired superelevations;

(e) an electrical circuit including at least one indicating device, the electrical circuit being connected to said potentiometer and receiving the respective electrical signals therefrom, whereby the signals representative of a desired superelevation and the signals varying with the pivotal movement of the pendulum may be compared; and (f) means for changing the electrical signals varying with the pivotal movement of the pendulum in dependence on the direction of superelevation, said last-named means including (1) a switch in said electrical circuit, (2) a voltage source delivering a constant voltage to said potentiometer producing the electrical signals representative of desired superelevations and to said switch, (3) two branch lines connecting respective poles of said switch to said potentiometer producing electrical signals in response to the pivotal movement of the pendulum, and (4) different electrical resistors in said branch lines whereby the direction of voltage drop in the latter potentiometer may be controlled by said switch.

References Cited

UNITED STATES PATENTS

| 2,120,771 | 6/1938 | Thompson. | |
| 2,488,792 | 11/1949 | Zindel | 74—10.7 |
| 2,745,087 | 5/1956 | Dickinson | 73—313 X |
| 2,772,411 | 11/1956 | Cooper | 340—282 |
| 3,111,908 | 11/1963 | Plasser et al. | 33—145 X |
| 3,295,219 | 1/1966 | Stockton et al. | |

FOREIGN PATENTS

| 687,029 | 5/1964 | Canada. |
| 1,230,329 | 3/1960 | France. |

HARRY N. HAROIAN, *Primary Examiner.*

U.S. Cl. X.R.

33—215